(12) United States Patent
Chai et al.

(10) Patent No.: US 9,712,518 B2
(45) Date of Patent: Jul. 18, 2017

(54) APPARATUS USED FOR SECURITY INFORMATION INTERACTION

(71) Applicant: CHINA UNIONPAY CO., LTD., Shanghai (CN)

(72) Inventors: Hongfeng Chai, Shanghai (CN); Zhijun Lu, Shanghai (CN); Shuo He, Shanghai (CN); Wei Guo, Shanghai (CN); Yu Zhou, Shanghai (CN); Chengqian Chen, Shanghai (CN); Jianbin Zheng, Shanghai (CN); Xiangxiang Yan, Shanghai (CN); Bin Yu, Shanghai (CN); Dingzhou Li, Shanghai (CN)

(73) Assignee: China Unionpay Co., Ltd. (CN)

( * ) Notice: Subject to any disclaimer, the term of this patent is extended or adjusted under 35 U.S.C. 154(b) by 0 days.

(21) Appl. No.: 14/772,514

(22) PCT Filed: Mar. 3, 2014

(86) PCT No.: PCT/CN2014/072801
§ 371 (c)(1),
(2) Date: Sep. 3, 2015

(87) PCT Pub. No.: WO2014/135046
PCT Pub. Date: Sep. 12, 2014

(65) Prior Publication Data
US 2016/0014115 A1    Jan. 14, 2016

(30) Foreign Application Priority Data

Mar. 7, 2013   (CN) .......................... 2013 1 0072643

(51) Int. Cl.
*H04L 29/00*      (2006.01)
*H04L 29/06*      (2006.01)
(Continued)

(52) U.S. Cl.
CPC .......... *H04L 63/0823* (2013.01); *G06F 21/74* (2013.01); *G06Q 20/3276* (2013.01);
(Continued)

(58) Field of Classification Search
CPC .. H04L 9/00; H04W 12/04; G06F 7/04; G06F 9/44
(Continued)

(56) References Cited

U.S. PATENT DOCUMENTS 7,146,640 B2 * 12/2006 Goodman ............... G06F 21/53
709/223
2009/0290712 A1   11/2009 Henry et al.
2012/0209749 A1    8/2012 Hammad et al.

FOREIGN PATENT DOCUMENTS

CN      101059768 A     10/2007
CN      101355551 A      1/2009
(Continued)

OTHER PUBLICATIONS

International Search Report corresponding to International Application No. PCT/CN2014/072801 mailed Jun. 5, 2014.
(Continued)

*Primary Examiner* — Anthony Brown
*Assistant Examiner* — Michael D. Anderson
(74) *Attorney, Agent, or Firm* — Myers Bigel, P.A.

(57) ABSTRACT

The invention provides an apparatus used for security information interaction comprising a first system management device for providing an operational environment for routine applications and a second system management device for providing an operational environment in a safe mode for security applications so as to perform a security information interaction process. The apparatus used for security information interaction disclosed by the invention has a high safety and a wide applicability and is low in cost.

10 Claims, 1 Drawing Sheet

(51) Int. Cl.
  *G06F 21/74*  (2013.01)
  *G06Q 20/32*  (2012.01)
  *G06Q 20/38*  (2012.01)

(52) U.S. Cl.
  CPC ....... *G06Q 20/382* (2013.01); *H04L 63/0281* (2013.01); *H04L 63/04* (2013.01)

(58) Field of Classification Search
  USPC .......................................................... 726/10
  See application file for complete search history.

(56) References Cited

FOREIGN PATENT DOCUMENTS

| | | | |
|---|---|---|---|
| CN | 101409719 | A | 4/2009 |
| CN | 101741826 | A | 6/2010 |
| CN | 102103778 | A | 6/2011 |
| CN | 102158385 | A | 8/2011 |
| CN | 102333072 | A | 1/2012 |
| CN | 103686716 | A * | 3/2014 |
| WO | WO 2006/045343 | A1 | 5/2006 |
| WO | WO 2007/044500 | A2 | 4/2007 |
| WO | WO 2011/014355 | A1 | 2/2011 |

OTHER PUBLICATIONS

Extended European Search Report corresponding to European Patent Application No. 14761056.2 (10 pages) (dated Sep. 14, 2016).
Office Action issued on Oct. 17, 2016 in corresponding Chinese Application No. 201310072643.2 (8 pages).

* cited by examiner

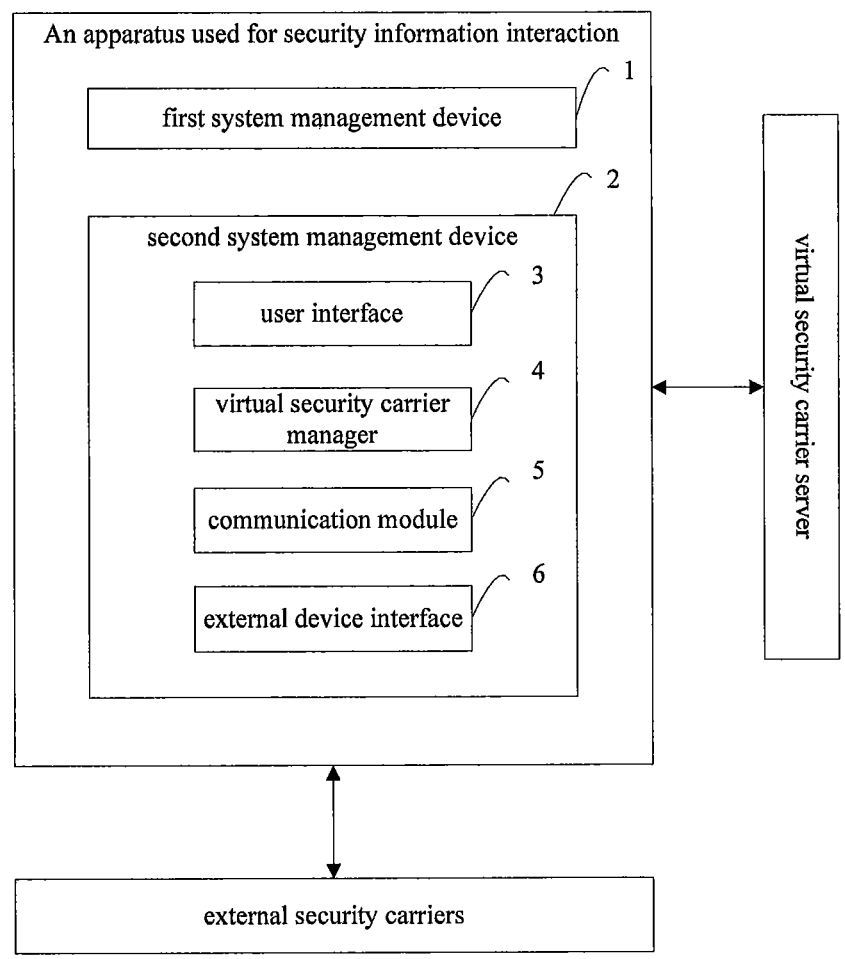

APPARATUS USED FOR SECURITY INFORMATION INTERACTION

RELATED APPLICATIONS

This application is a 35 U.S.C. §371 national phase application of PCT Application PCT/CN2014/072801 filed Mar. 3, 2014 which claims priority to Chinese Application No. 201310072643.2 filed Mar. 7, 2013. The entire content of each is incorporated herein by reference in its entirety.

FIELD OF THE INVENTION

The present invention relates to an apparatus used for information interaction, and in particular, to an apparatus used for security information interaction.

BACKGROUND

Currently, with the increasing development of computers and network applications and the increasing abundance of business types in different fields, an apparatus used for security information interaction (i.e., the information interaction having a high demand on safety, for example, the transaction processing procedure in financial fields), in particular, an apparatus used for security information interaction that is based on a mobile terminal, is becoming more and more important.

In the existing technical solutions, in order to improve the security of the information interaction apparatus, the following two ways are typically used: (1) improve the security mechanisms of the system management devices (e.g., the conventional multi-media operational systems) of the existing information interaction apparatuses, e.g., enhancing the firewall, anti-virus software, etc; and (2) guide the system management devices of the existing information interaction apparatuses safely in the manner of trusted computing, i.e., strictly manage the development, installation and operation of the application programs for the information interaction apparatuses (e.g., achieving the safe guidance by way of signature).

However, the existing technical solutions have the following problems: (1) since new viruses and trojan horse virus may continuously arise, it would be difficult for the above first way to provide an active and thorough solution; and (2) since the system management devices (e.g., the conventional multi-media operational systems) of the information interaction apparatuses have bugs themselves, the bugs of themselves will also exist even if the manner of safe guidance is used. Moreover, the frequent update of the systems and the frequent modifications to application programs will lead to an overly high cost.

Therefore, there exists the need to provide an apparatus used for security information interaction which has a high safety and a wide applicability and which is low in cost.

SUMMARY OF THE INVENTION

In order to address the problems in the above solutions in the prior art, the invention proposes an apparatus used for security information interaction which has a high safety and a wide applicability and which is low in cost.

The object of the invention is achieved by the following technical solutions:

An apparatus used for security information interaction, comprising:

a first system management device for providing an operational environment for routine applications;

a second system management device for providing an operational environment in a safe mode for security applications so as to perform a security information interaction process;

wherein, in case that the current application to be operated is a routine application, the apparatus used for security information interaction selects the first system management device as a currently used system management device, and in case that the current application to be operated is a security application, the apparatus used for security information interaction selects the second system management device as a currently used system management device.

In the above disclosed solution, preferably, the resource used by the second system management device is isolated from the resource used by the first system management device.

In the above disclosed solution, preferably, the second system management device further comprises:

an external device interface for providing a safe data communication interface for various types of external security carriers;

a virtual security carrier manager which, based on a virtual security carrier creating request received from a virtual security carrier server and the associated safety certificate, creates and initializes a virtual security carrier;

a communication module for establishing a data communication link in an peer to peer mode between two or more data processing nodes, wherein the data processing nodes comprise the external security carriers, the virtual security carrier and any other associated internal or external devices or functional units; and a user interface for providing a human-machine interactive interface for the external security carriers and/or the virtual security carrier in a mutual authentication manner.

In the above disclosed solution, preferably, the second system management device further comprises one or more additionally functional devices for performing one or more of the following functions: complicated algorithm achievement, network browsing and storage space expansion.

In the above disclosed solution, preferably, the virtual security carrier manager assigns separate resources for each created virtual security carrier so as to provide mutual isolation between different virtual security carriers.

In the above disclosed solution, preferably, the external security carriers and/or the virtual security carrier can communicate with a corresponding trusted service management device via the communication module so as to perform the associated security information interaction process.

In the above disclosed solution, preferably, the second system management device further comprises a security information management module, the security information management module stores one or more security information and is able to dynamically generate and encrypt the image containing the selected security information based on a user's selection instruction, and then presents the image via the user interface so that an external security information interactive terminal can read and decrypt the image so as to finish the subsequent security information interactive process.

The apparatus used for security information interaction disclosed by the invention has the following advantages: (1) an operational environment in a safe mode can be provided for security applications so that the security of apparatus is considerably improved; (2) the applicability and convenience of the apparatus are improved since a safe human-machine interactive interface can be provided for the external security carriers and/or the virtual security carrier in a mutual authentication manner; (3) the relationship between the security carrier and the apparatus is no longer a master-slave relationship but an peer to peer relationship since a data communication link in an peer to peer mode can be established between two or more data processing nodes, thus an apparatus having various interfaces and complete functions can be used as a public service computing platform, thereby expanding the data processing capacity of various security carriers; and (4) the configuration flexibility of the security applications is improved since a virtual security carrier can be provided.

BRIEF DESCRIPTION OF THE DRAWINGS

The technical features and advantages of the invention will be better understood by those skilled in the art with reference to the accompanying drawing.

FIG. 1 is a schematic structure view of an apparatus used for security information interaction according to an embodiment of the invention.

DETAILED DESCRIPTION OF THE INVENTION

FIG. 1 is a schematic structure view of an apparatus used for security information interaction according to an embodiment of the invention. As shown in FIG. 1 the apparatus used for security information interaction disclosed in the invention comprises a first system management device 1 and a second system management device 2, wherein the first system management device 1 (e.g., a conventional multimedia operational system) provides an operational environment for routine applications, the second system management device 2 provides an operational environment in a safe mode for security applications (i.e., the applications having a higher safety requirement, e.g., payment applications in financial field) so as to perform a security information interaction process. In case that the current application to be operated is a routine application, the apparatus used for security information interaction selects the first system management device 1 as a currently used system management device, and in case that the current application to be operated is a security application, the apparatus used for security information interaction selects the second system management device 2 as a currently used system management device (by way of example, the apparatus used for security information interaction can make a switch between the first system management device 1 and the second system management device 2).

Preferably, in the apparatus used for security information interaction disclosed by the invention, the resource used by the second system management device 2 is isolated from the resource used by the first system management device 1 (by means of hardware mechanism or software mechanism).

Preferably, in the apparatus used for security information interaction disclosed by the invention, the second system management device 2 further comprises a user interface 3, a virtual security carrier manager 4, a communication module 5 and an external device interface 6. The external device interface 6 provides a safe data communication interface for various types of external security carriers (i.e., devices for performing a security information interaction process, for example, but not limited to, SIM card, smart SD card or other safe units, all of which are carriers that can safely store and run programs and are independent computing platforms having no display device and having keyboard input, e.g.). The virtual security carrier manager 4, based on a virtual security carrier creating request received from a virtual security carrier server and the associated safety certificate, creates and initializes a virtual security carrier (i.e., a virtual device for performing security information interaction and associated with a specific third party, for example, a virtual safe unit that is simulated for different institutions). The communication module 5 establishes a data communication link in an peer to peer mode between two or more data processing nodes (the communication technology that is used is, for example but not limited to, WLAN, GPRS, CDMA, WCDMA, TD-SCDMA, CDMA2000, LTE, etc), wherein the data processing nodes comprise the external security carriers, the virtual security carrier and any other associated internal or external devices or functional units. The user interface 3 provides a human-machine interactive interface (e.g., keyboard, screen, mouse, etc., by way of example, the human-machine interactive interface of the second system management device can share the hardware resource of the human-machine interactive interface of the first system management device) for the external security carriers and/or the virtual security carrier in a mutual authentication manner.

Optionally, in the apparatus used for security information interaction disclosed by the invention, the second system management device 2 further comprises one or more additionally functional devices for performing one or more of the following functions: complicated algorithm achievement, network browsing and storage space expansion.

Preferably, in the apparatus used for security information interaction disclosed by the invention, the virtual security carrier manager 4 assigns separate resources for each created virtual security carrier so as to provide mutual isolation between different virtual security carriers.

By way of example, in the apparatus used for security information interaction disclosed by the invention, the external security carriers and/or the virtual security carrier can communicate with a corresponding trusted service management (TSM) device via the communication module 5 so as to perform an associated security information interaction process.

Optionally, in the apparatus used for security information interaction disclosed by the invention, the second system management device 2 further comprises a security information management module, the security information management module stores one or more security information (e.g., bank card number or bank card magnetic track information) and is able to dynamically generate and encrypt an image containing the selected security information based on a user's selection instruction (e.g., input by the user interface 3), and then presents the image via the user interface 3 so that the external security information interactive terminal (e.g., a POS machine) can read and decrypt the image so as to finish the subsequent security information interactive process (e.g., a transaction process).

By way of example, in the apparatus used for security information interaction disclosed by the invention, the image containing the selected security information and generated by the security information management module is one of the followings: a digital picture; a two-dimension code picture and a bar code picture.

By way of example, in the apparatus used for security information interaction disclosed by the invention, the security information management module encrypts the image containing the selected security information based on the current time of system (i.e., this encrypting manner has a time effectiveness).

As can be seen from the above, the apparatus used for security information interaction disclosed by the invention has the following advantages: (1) an operational environment in a safe mode can be provided for security applications so that the safety of apparatus is considerably improved; (2) the applicability and convenience of the apparatus are improved since a safe human-machine interactive interface can be provided for the external security carriers and/or the virtual security carrier in a mutual authentication manner; (3) the relationship between the security carrier and the apparatus is no longer a master-slave relationship but an peer to peer relationship since a data communication link in an peer to peer mode can be established between two or more data processing nodes, thus the apparatus having various interfaces and complete functions can be used as a public service computing platform, thereby expanding the data processing capacity of various security carriers; and (4) the configuration flexibility of security applications is improved since a virtual security carrier can be provided.

While the invention has been described by way of the above preferred embodiments, the implementations thereof are not limited to the aforementioned embodiments. It should be noted that those skilled in the art can make various variations and modifications to the invention without departing from the spirit and scope thereof.

The invention claimed is:

1. An apparatus comprising:
   a first system management device configured to provide an operational environment for routine applications; and
   a second system management device, different from the first system management device, configured to provide an operational environment having a safe mode for security applications and configured to perform a security information interaction process,
   wherein, when an operating application is a routine application, the apparatus is configured to select the first system management device, and when the operating application is a security application, the apparatus is configured to select the second system management device, and
   wherein a resource used by the second system management device is isolated from the first system management device by a hardware mechanism.

2. The apparatus according to claim 1, wherein the second system management device comprises:
   an external device interface configured to provide a safe data communication interface for various types of external security carriers;
   a virtual security carrier manager configured to create and initialize a virtual security carrier based on a virtual security carrier creating request received from a virtual security carrier server and an associated safety certificate;
   a communication module configured to establish a data communication link in an peer to peer mode between two or more data processing nodes, wherein the two or more data processing nodes comprise the virtual security carrier; and
   a user interface configured to provide a human-machine interactive interface for an external security carrier and/or the virtual security carrier in a mutual authentication manner.

3. The apparatus according to claim 2, wherein the second system management device further comprises one or more additionally functional devices configured to perform one or more of: complicated algorithm achievement, network browsing and/or storage space expansion.

4. The apparatus according to claim 3, wherein the virtual security carrier manager assigns separate resources for each virtual security carrier created by the virtual security carrier manager, and provides mutual isolation between different virtual security carriers.

5. The apparatus according to claim 4, wherein the external security carrier and/or the virtual security carrier is configured to communicate with a corresponding trusted service management device via the communication module and perform an associated security information interaction process.

6. An apparatus comprising:
   a first system management device configured to provide an operational environment for routine applications;
   a second system management device configured to provide an operational environment having a safe mode for security applications and configured to perform a security information interaction process;
   an external device interface configured to provide a safe data communication interface for various types of external security carriers;
   a virtual security carrier manager configured to create and initialize a virtual security carrier based on a virtual security carrier creating request received from a virtual security carrier server and an associated safety certificate;
   a communication module configured to establish a data communication link in an peer to peer mode between two or more data processing nodes, wherein the two or more data processing nodes comprise the virtual security carrier; and
   a user interface configured to provide a human-machine interactive interface for an external security carrier and/or the virtual security carrier in a mutual authentication manner,
   wherein, in a first case where an operating application is a routine application, the apparatus selects the first system management device as a used system management device, and in a second case that the operating application is a security application, the apparatus selects the second system management device as the used system management device,
   wherein a resource used by the second system management device is isolated from a resource used by the first system management device,
   wherein the second system management device comprises one or more additionally functional devices configured to perform one or more of: complicated algorithm achievement, network browsing and/or storage space expansion,
   wherein the virtual security carrier manager is configured to assign separate resources for each virtual security carrier created by the virtual security carrier manager and configured to provide mutual isolation between different virtual security carriers,
   wherein the external security carrier and/or the virtual security carrier is configured communicate with a corresponding trusted service management device via the communication module and perform an associated security information interaction process, and wherein the second system management device further comprises a security information management module storing security information and configured to:
generate and encrypt an image containing the security information based on a selection instruction received as user input, and
present the image via the user interface to an external security information interactive terminal that can read and decrypt the image and finish a security information interactive process.

7. The apparatus according to claim 1, wherein the first system management device is physically separate from the second system management device within the apparatus.

8. An apparatus comprising:
a first system management device configured to provide an operational environment for routine applications; and
a second system management device configured to provide an operational environment having a safe mode for security applications and configured to perform a security information interaction process, wherein the second system management device comprises a user interface configured to provide a human-machine interactive interface,
wherein, when an operating application is a routine application, the apparatus is configured to select the first system management device as a used system management device, and when the operating application is a security application, the apparatus selects the second system management device as the used system management device,
wherein the second system management device further comprises a security information management module that stores security information and is configured to generate and encrypt an image containing the security information based on a selection instruction received as user input, and is further configured to present the image via the user interface to an external security information interactive terminal that can read and decrypt the image in completing a security information interactive process.

9. The apparatus according to claim 8, wherein a resource used by the second system management device is isolated from the first system management device.

10. The apparatus according to claim 8, where the second system management device further comprises:
an external device interface configured to provide a safe data communication interface for various types of external security carriers;
a virtual security carrier manager configured to create and initialize a virtual security carrier based on a virtual security carrier creating request received from a virtual security carrier server and an associated safety certificate; and
a communication module configured to establish a data communication link in an peer to peer mode between two or more data processing nodes, wherein the two or more data processing nodes comprise the virtual security carrier, and
wherein the user interface is configured to a human-machine interactive interface for an external security carrier and/or the virtual security carrier in a mutual authentication manner.

* * * * *

UNITED STATES PATENT AND TRADEMARK OFFICE
CERTIFICATE OF CORRECTION

PATENT NO. : 9,712,518 B2  
APPLICATION NO. : 14/772514  
DATED : July 18, 2017  
INVENTOR(S) : Chai et al.

Page 1 of 1

It is certified that error appears in the above-identified patent and that said Letters Patent is hereby corrected as shown below:

On the Title Page

(30) Foreign Application Priority Data: Please correct "2013 1 0072643" to read
-- 2013 1 0072643.2 --

Signed and Sealed this
Seventeenth Day of April, 2018

Andrei Iancu
*Director of the United States Patent and Trademark Office*